US005127180A

United States Patent [19]

Norton et al.

[11] Patent Number: 5,127,180

[45] Date of Patent: Jul. 7, 1992

[54] CAMOUFLAGE DEVICE FOR ARCHERY BOW

[75] Inventors: Don S. Norton; Donald K. Norton, both of Clinton, Miss.

[73] Assignee: Brell Mar Products, Inc., Jackson, Miss.

[21] Appl. No.: 724,937

[22] Filed: Jul. 2, 1991

[51] Int. Cl.[5] .............................................. A01M 31/00

[52] U.S. Cl. ........................................... 43/1; 135/901

[58] Field of Search ................ 43/1; 135/901; 124/86, 124/88; 403/84; 40/601, 603, 604, 610, 607; 248/291

[56] References Cited

U.S. PATENT DOCUMENTS

| | | | |
|---|---|---|---|
| 3,179,102 | 4/1965 | Peckham | 124/88 X |
| 3,591,940 | 7/1971 | Siemmons | 40/603 |
| 3,850,401 | 11/1974 | Snediker | 40/604 X |
| 4,817,579 | 4/1989 | Mathias | 43/1 X |
| 4,876,817 | 10/1989 | Hill | 43/1 |

*Primary Examiner*—Richard K. Seidel

*Assistant Examiner*—Patty E. Hong

*Attorney, Agent, or Firm*—Nixon & Vanderhye

[57] ABSTRACT

A camouflage device for archery bows includes mounting blocks adapted to being affixed to the bow in spaced relationship. The mounting blocks define first and second sets of sockets adapted to receive a proximal end portion of a tubular support arm so as to establish an extended condition (wherein the arms are oriented generally transverse to the long axis of the bow), and a collapsed condition (wherein the arms are oriented in general alignment with the bow's long axis). A camouflage curtain is supported by and extends between the upper and lower ones of the support arms so as to provide a blind for the archer, but yet allow the archer to track game targets, for example. An elastic cord joins the pair of arms so as to bias the proximal ends thereof into positive seated relationship with a respective socket. The arms, moreover, preferably have a bowed configuration so as to allow the arms to rotate generally about their longitudinal axes between states which exert greater and lesser tension upon the camouflage curtain.

22 Claims, 3 Drawing Sheets

AB
18
R
14a
14a'
14b'
14b
10
24
22
12
16a
16a'
16b
20
16b'

18
14a
14b
24
10
12
16a
16b
20

AB
18
14a
14b
12
22
10
16b
16a
20

CAMOUFLAGE DEVICE FOR ARCHERY BOW

FIELD OF THE INVENTION

The present invention generally relates to camouflage devices. More specifically, the present invention relates to camouflage devices, preferably in kit form, which are especially adapted to be mounted to an archery bow so as to provide a blind which is transportable with the bow, but which enables an archer to visually track game targets.

BACKGROUND OF THE INVENTION

A bow-mountable camouflage device is disclosed in U.S. Pat. No. 4,876,817 and includes a camouflage sheet extending between upper and lower vertically separated support members attached to a forward surface of an archer's bow. The support members are each provided with a central support section and an opposing pair of arms (called "end sections" in the parlance of the '817 patent). The arm pairs are pivotally coupled to respective central support sections so as to be pivotal between an extended position (in which the arms are generally transverse to the long axis of the bow), and a collapsed position (in which the arms are generally aligned with the long axis of the bow).

The pivot structures which enable the arms to pivot between their respective extended and collapsed positions are said to be conventional in that each is formed of a leaf spring, detent and pivot pin (see FIGS. 4 and 5 in U.S. Pat. No. 4,876,817 and the accompanying description thereof at column 3, line 52 bridging column 4, line 15). The leaf spring thus is adapted to be received within corresponding detents when the arms are axially aligned with one another (i.e., in their extended position).

It can be envisioned, however, that after repeated usage over time, the detent structures of the variety disclosed in the '817 patent may wear to an extent whereby the arms could possibly not be maintained in axial alignment with one another. As a result, the camouflage device may not be capable of being reliably retained in a condition whereby the camouflage sheet is fully exposed. That is, the worn detent structures could possibly not provide sufficient detention capabilities with the arms extended, thereby allowing the arms to fall under their own weight to their collapsed position.

SUMMARY OF THE INVENTION

The camouflage device according to the present invention is provided with mounting structures which not only enable the support arms for the camouflage curtain to be movable between extended and collapsed conditions, but which also significantly minimize (if not eliminate) the possibility that the mobility and/or functions of the arms will degrade over time through usage. The device of the present invention thus allows the arms to be retained reliably in one of their extended and collapsed conditions, yet enables the support arms to be moved repeatedly between such conditions when desired.

In preferred forms, the present invention is embodied in a camouflage device having upper and lower mounting blocks each adapted to being attached to a forward surface of an archery bow so as to be generally vertically separated from one another in mirrored opposition along the bow's long axis. Each of the mounting blocks is provided with first and second sets of paired sockets adapted to receiving a proximal end portion of a respective tubular support arm therein. Thus, when the support arms are each received within a respective one of the first set of paired sockets, the arms will be in a collapsed condition such that each arm is oriented in general alignment with the bow's long axis and will be in lateral opposition to the other arm. However, when the end portions of the arms are physically removed from the first set of paired sockets and transferred to the second set of paired sockets, the arms will be in an extended condition such that the arms are generally coaxially aligned with one another, and thus are oriented generally transverse to the bow's long axis.

Preferably, a length of elastic cord extends through the mounting block and is attached at each of its ends to a respective proximal end of the tubular support arms associated with that mounting block. The length of the elastic cord is such that it serves to forcibly bias the arms into a positive seated relationship with the first and second sets of paired sockets when the arms are moved into their collapsed and extended conditions, respectively. Thus, the arms must be physically separated from one of the first and second sets of paired sockets against the bias force of the elastic cord in order to then be moved to the other set of paired sockets in the mounting block. A slot is formed in the mounting block between the first and second sets of paired sockets so as to provide a convenient passageway for the cord within the mounting block when the support arms are moved between their extended and collapsed conditions.

The support arms are most preferably bowed somewhat so as to assist in maintaining the camouflage curtain in a taut state when the device is in both its extended and collapsed conditions. Thus, when the camouflage device is in its extended condition, the proximal ends of the arms may be rotated within their respective sockets as needed so that the terminal ends of the opposed upper and lower pairs of support arms will diverge from one another. As a result, greater tension will be exerted upon the camouflage curtain between the upper and lower pairs of support arms (i.e., since a greater nominal dimension between the upper and lower support arms will exist) so as to maintain the sheet in a taut condition. Rotation of the upper and/or lower pairs of support arms to a state whereby the terminal ends converge towards one another will thereby cause a lesser tension to be exerted upon the camouflage curtain between the upper and lower pairs of arms (i.e., since a lesser nominal dimension between the upper and- lower arms will exist), which facilitates removal of the arms from their respective first set of sockets and movement to their respective second set of sockets (i.e., so that the arms are in a collapsed condition).

On the other hand, when the camouflage device is in its collapsed condition, the camouflage curtain may be rolled around the arms (e.g., prior to the proximal ends of the support arms being seated within the second set of sockets) so as to take up excess slack. The support arms may then be rotated as needed within their respective second set of sockets such that the outwardly bowed configuration of each arm is oriented in a lateral direction relative to the archer's bow (i.e., the terminal ends of the support arms converge toward the archer's bow). The bowed configuration of the arms will thereby exert greater tension on the remaining camouflage curtain between the opposed arms when in the collapsed condition. As a result, the remaining camouflage curtain will be maintained in a substantially taut state facilitating stowage and/or transport of the device as a unit with the archer's bow.

Further aspects and advantages of this invention will become more evident after careful consideration is given to the following detailed description of the preferred exemplary embodiments.

BRIEF DESCRIPTION OF THE ACCOMPANYING DRAWINGS

Reference will hereinafter be made to the accompanying drawings wherein like reference numerals throughout the various FIGURES denote like structural elements, and wherein.

FIGS. *4a–4d* show various views of an exemplary mounting block according to the present invention, wherein FIG. *4a* is a front elevational view thereof; FIG. *4b* is top plan view therof as taken along line *4b–4b* in FIG. *4a;* FIG. *4c* is a bottom view thereof as taken along line *4c–4c* in FIG. *4a;* and FIG. *4d* is an elevational cross-sectional view thereof as taken along line *4d–4d* in FIG. *4b;* and FIGS. *5a–5d* are perspective views of an exemplary mounting block (partially sectioned for clarity of presentation) depicting a sequence whereby the support arms are moved physically between their collapsed and extended conditions.

DETAILED DESCRIPTION OF THE PREFERRED EXEMPLARY EMBODIMENTS

Figure 1:
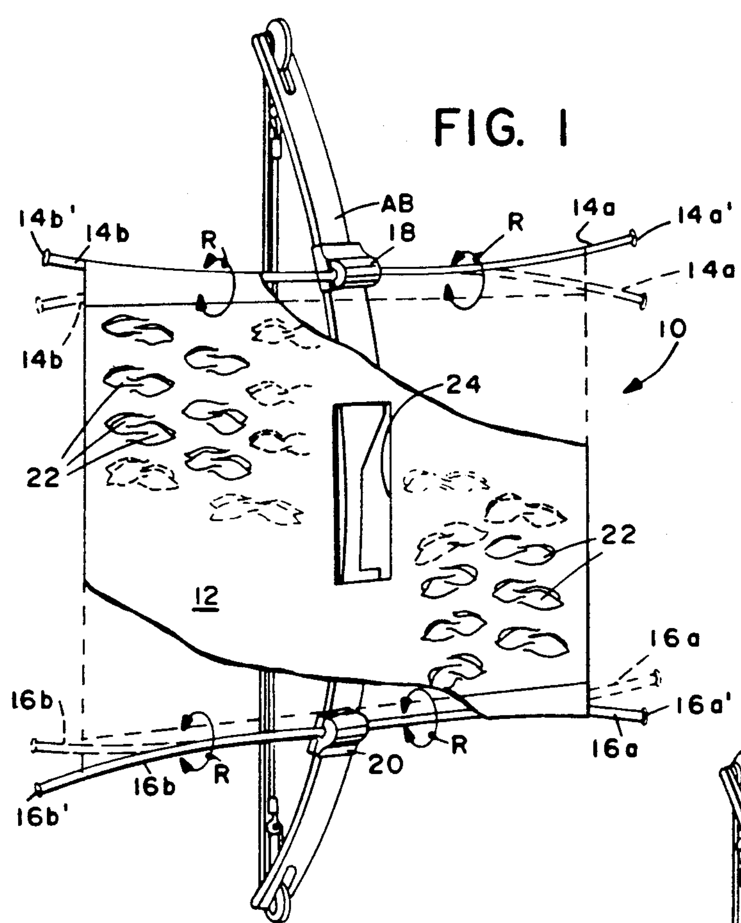
FIG. 1 is a front perspective view showing a camouflage device of this invention in an extended condition as mounted to an archery bow.
Figure 2:
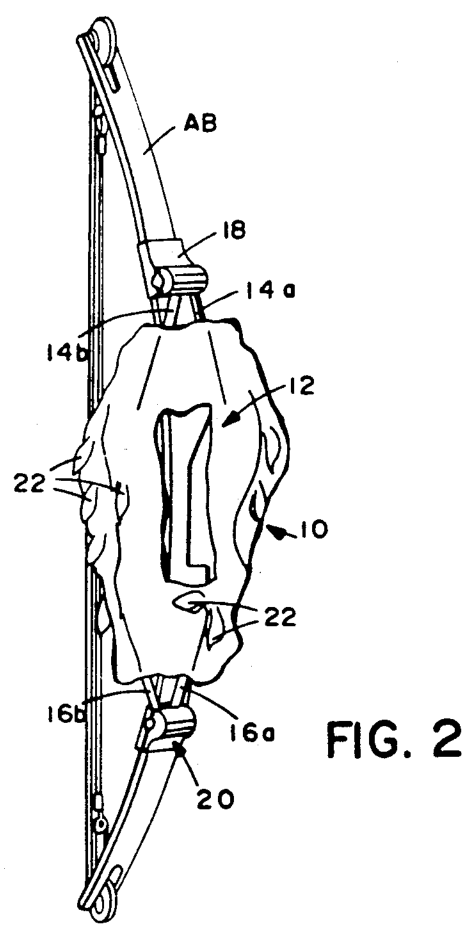
FIG. 2 is a front perspective view of a camouflage device according to this invention similar to FIG. 1, but depicted in a collapsed condition with the camouflage curtain loose between the arms.
Figure 4A:
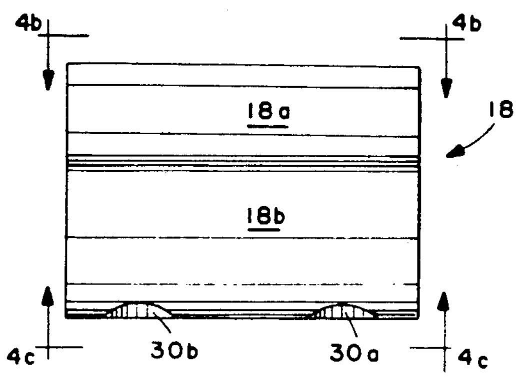
Figure 4B:
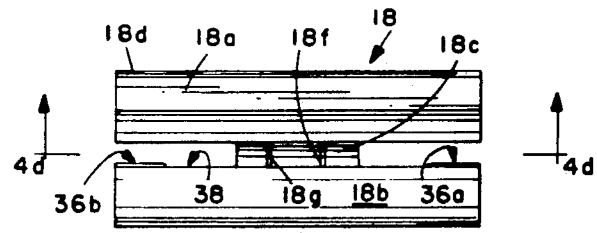
Figure 4C:
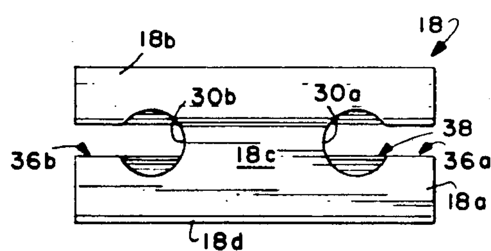
Figure 4D:
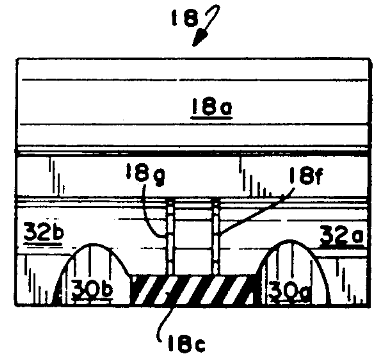

The camouflage device 10 is shown attached to an archery bow AB in accompanying FIG. 1 in an extended condition. The camouflage device generally includes a camouflage curtain 12 which is supported between opposed upper and lower pairs of tubular support arms *14a–14b* and *16a–16b.* When in their extended condition as shown in FIG. 1, the pairs of arms *14a–14b* and *16a–16b* are oriented generally transverse to the archery bow's long axis thereby enabling the camouflage curtain 12 to be deployed fully and provide a maximum camouflage effect. Each respectively associated with an upper and lower mounting block 18, 20, the function of which will be described in greater detail later. Suffice it to say at this point, however, that the upper and lower arms *14a–14b* and *16a–16b* cooperate with the upper and lower mounting blocks 18, 20, respectively, such that the arms *14a–14b* and *16a–16b* are capable of movements between an extended condition (as shown in FIG. 1) and a collapsed condition (as shown in FIG. 2).

The camouflage curtain 12 can be formed of any suitable material. For example, the camouflage curtain 12 may be in the form of a vinyl sheet with an appropriate camouflage pattern imprinted on a forward surface. Fabric sheets formed of natural and/or synthetic fibers may also be used as the camouflage curtain 12. Considering that the camouflage device 10 according to this invention is intended to be used in outdoor environments, the camouflage curtain 12 should be water-resistant and otherwise capable of withstanding the natural elements.

The camouflage curtain 12 is provided with a number of cuts forming a corresponding number of flaps (a few of which are identified in FIGS. 1 and 2 by reference numeral 22) arranged in any suitable pattern so as to impart a visual appearance to the camouflage curtain 12 which imitates natural foliage. In addition, a site window 24 is provided in a central portion of the sheet 12 to provide the archer with an unobstructed view of the game target, as well as providing an unobstructed path through the camouflage sheet 12 when the archer releases the arrow towards the target.

As shown in FIG. 1, the tubular arms *14a–14b* and *16a–16b* are bowed. In this connection, the bowed tubular arms may be rotated as needed relative to their respective (stationary) mounting block 18, 20 generally about each of the arm's respective longitudinal axis (arrows R in FIG. 1) so that the terminal ends of the upper and lower arms *14a–14b* and *16a–16b* diverge from one another (i.e., as shown in solid line in FIG. 1). This divergence of the terminal ends of the upper and lower arms *14a–14b* and *16a–16b* when in the extended condition as shown in FIG. 1 will thereby cause the camouflage curtain 12 to be tensioned therebetween. As a result the camouflage curtain is maintained in a taut state when the arms *14a–14b* and *16a–16b* are extended (i.e., are oriented generally transverse relative to the long axis of the archer's bow AB).

When it is desired to move the arms *14a–14b* and *16a–16b* to the collapsed state as shown in FIG. 2, the arms *14a–14b* and/or *16a–16b* may again be rotated relative to the the mounting blocks 18, 20 about their respective longitudinal axis (arrows R in FIG. 1) such that the terminal ends of the arms *14a–14b* and *16a–16b* converge toward one another (i.e., as shown in phantom line in FIG. 1). As a result, the tensioning of the camouflage curtain 12 will be relaxed somewhat thereby more easily facilitating removal of the tubular arms *14a–14b* and *16a–16b* from their respective mounting blocks 18, 20.

Figure 3:
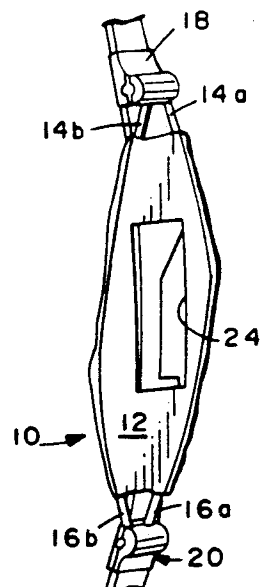
FIG. 3 is a front perspective view of a camouflage device according to this invention similar to FIG. 2, but shown with the camouflage curtain in a taut state.

The bowed arms *14a–14b* and *16a–16b* also serve to maintain the camouflage curtain 12 in a taut state when the device 10 is in its collapsed condition. In this connection, when the archer desires to fully stow the camouflage device 10 without removing it from the bow (e.g., to facilitate storage and/or transport of the device 10 as a unit with the archer's bow AB), the excess of the camouflage curtain 12 which is present when the arms *14a–14b* and *16a–16b* are moved into their collapsed condition (e.g., as depicted in FIG. 2) may be wound around the arms *14a, 16a,* on the one hand, and the arms *14b, 16b* on the other hand. The tubular arms *14a–14b* and *16a–16b* may then be rotated relative to their respective mounting block 18, 20 so that they bow laterally (outwardly) in relation to the long axis of the archer's bow AB. As a result, the remainder of the camouflage curtain 12 is tensioned between the arms *14a–14b* and *16a–16b* as shown in FIG. 3.

The upper mounting block 18 is shown in FIGS. *4a–4d,* and is exemplary of the structures/functions associated with the lower mounting block 20. In this regard, it will be appreciated that the upper and lower mounting blocks 18, 20 are structurally and functionally identical to one another, but when affixed to the archer's bow AB, will be in mirrored opposition to one another. Hence, the discussion which follows in terms of the structures/functions attributable to upper mounting block 18 is equally applicable to the structures/functions attributable to lower mounting block 20.

The upper mounting block 18 depicted in FIGS. *4a–4d* is preferably a one-piece molded body formed of any suitable thermoplastic material, and generally includes a back plate 18*a* and a curved nose piece 18*b* extending the lengthwise dimension of the back plate 18*a*. The back plate 18*a* and nose piece 18*b* are integrally (preferably unitarily) joined to one another by means of central column 18*c* (see FIG. *4d*).

The back plate 18*a* most preferably includes a pressure sensitive adhesive layer 18*d* covered by a suitable protective film until usage. The adhesive layer 18*d* thus enables the mounting block 18 to be affixed at an appropriate location on the archer's bow AB. The mounting block 18 (and 20) may, however, be affixed to the archery bow AB in any other convenient and/or expedient manner. For example, virtually any conventional fastener system may be employed, such as, belts, snaps, elastic straps, Velcro-brand loop and pile fabric fasteners, and the like.

Paired sets of sockets 30*a*–30*b* and 32*a*–32*b* are collectively defined by means of the back plate 18*a* and the nose piece 18*b* of the mounting block 18 and are sized and configured to receive a respective proximal end of the arms 14*a*–14*b*. The first set of sockets 30*a*–30*b* will generally aligned with the long axis of the archery bow AB when the mounting block 18 is affixed thereto so as to establish the collapsed condition of the arms 14*a*–14*b*. The second set of sockets 32*a*–32*b*, on the other hand, are substantially coaxially aligned with one another so as to be oriented generally transverse with the long axis of the archery bow AB, and thereby establish the extended condition of the arms 14*a*–14*b*.

Sockets 30*a* and 32*a* are joined by a slotted passageway 36*a*, while sockets 30*b* and 32*b* are joined by a slotted passageway 36*b*. The slotted passageways 36*a*–36*b* each allow a portion of an elastic cord 34 (not shown in FIGS. *4a–4d*, but see FIGS. *5a–5d*) which join the arms 14*a*–14*b* one to another to pass between sockets 30*a*–30*b* and sockets 32*a*–32*b* when the arms 14*a*–14*b* are moved between their collapsed and extended conditions. A removal slot 38 coextensive with the lengthwise dimension (as determined in a direction generally transverse to the long axis of the archer's bow AB) of the mounting block 18 is also defined between the back plate 18*a* and nose piece 18*b*. The removal slot 38 allows for the complete separation from the block 18 of the arms 14*a*–14*b* when joined by means of the elastic cord 34 (e.g., by pulling the proximal ends of the arms 14*a*–14*b* so that they separate from their respective sockets 32*a*–32*b*, and then moving the cord through the removal slot 38). Thus, the arms 14*a*–14*b* and 16*a*–16*b* may be removed from their associated mounting blocks 18, 20, respectively, and stored during periods of nonuse.

The central column 18*c* includes an annular pair of stops 18*f*, 18*g* which serve to establish the internal limit of the sockets 32*a* and 32*b*. The stops 18*f*, 18*g* thereby provide a surface against which the proximal ends of the arms 14*a* and 14*b*, respectively, bear when seated within the sockets 32*a* and 32*b*. The internal limit of the sockets 30*a* and 30*b* is provided by an upper portion of the sockets 32*a* and 32*b*.

The manner in which the arms 14*a*–16*b* may be moved between their extended and collapsed states will be better understood from accompanying FIGS. 5*a*–5*d*. In this regard, accompanying FIGS. *5a–5d*, like FIGS. *4a–4d* discussed above, show only the upper mounting block 18 (partly sectioned for clarity of presentation) and the proximal end portions of arms 14*a* and 14*b*. Since the mounting blocks 18, 20 are identical (but are in mirrored opposition when affixed to the archery bow AB), the discussion which follows is again equally applicable to the structural and functional interrelationship between the mounting block 20 and the lower pair of arms 16*a*–16*b*.

Figure 5B:
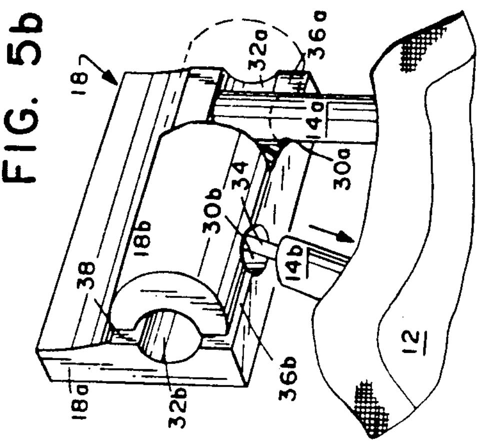
Figure 5D:
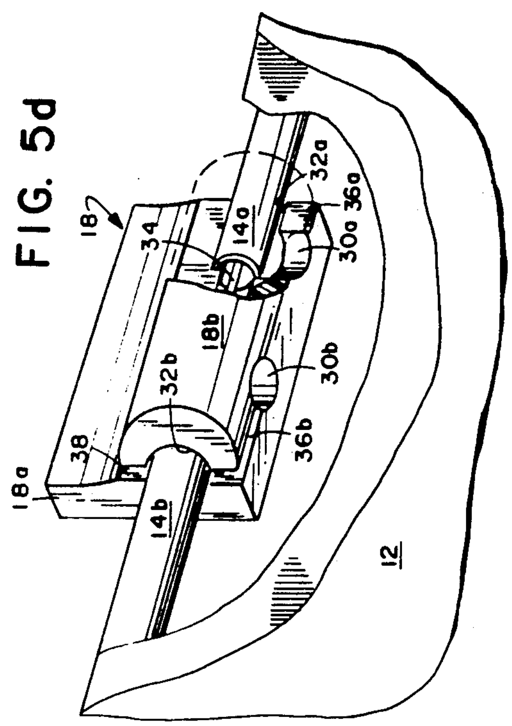
Figure 5A:
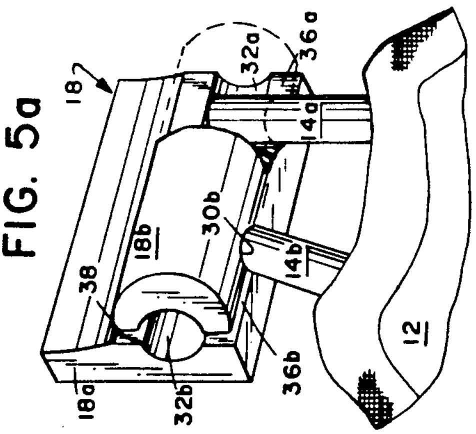

As shown in FIG. 5*a* each of the arms 14*a* and 14*b* is seated within a respective one of the first set of sockets 30*a*, 30*b* formed in the mounting block 18. An elastic cord 34 is fixed to and extends between each of the tubular arms 14*a* and 14*b*. In this regard, the elastic cord 34 preferably extends through the entire length within the tubular support arms 14*a*–14*b* and is secured therewithin by means of the end caps 14*a*', 14*b*', respectively (see FIG. 1). Similarly, the end caps 16*a*', 16*b*' secure an elastic cord within the arms 16*a* and 16*b* (again, see FIG. 1).

Figure 5C:
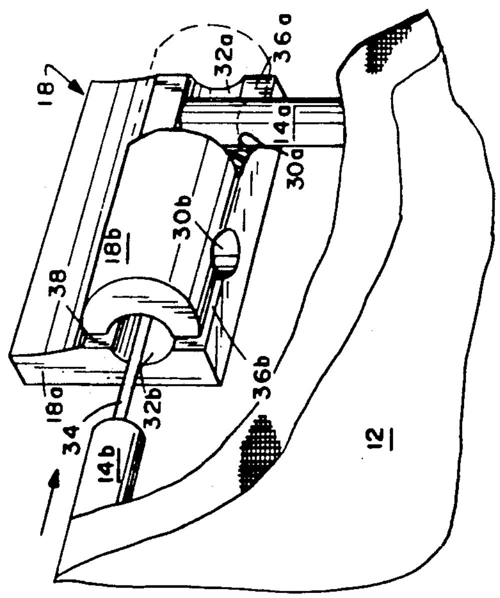

When it is desired to move the arms 14*a* and 14*b* from their collapsed condition to their extended condition, one of the arms, for example arm 14*b*, is pulled outwardly in the direction of the arrow in FIG. 5*b* so that its proximal end separates from the stationary mounting block 18 (i.e., since the mounting block is attached to the archer's bow AB) against the bias force of elastic cord 34 (i.e., since the elastic cord is tensioned when the arm 14*b* is pulled from the mounting block 18. The separated proximal end portion of the arm 14*b* may then be moved into alignment with socket 32*b* as shown in FIG. 5*c*. Once aligned, the proximal end of the tubular arm 14*b* may be seated within the socket 32*b* of mounting block 18 (e.g., as shown by the arrow in FIG. 5*c*) under the influence of the bias force provided by the elastic cord 34. As a result, the arm 14*a* will reliably be maintained in its extended condition as shown in FIG. 5*d* due to its being positively seated within the socket 32*b*.

In a similar manner, the other arm 14*a* may be separated from socket 30*a* against the bias force of the elastic cord 34 and seated within the socket 32*a* so as to be maintained in its extended position (see FIG. 5*d*). It will be appreciated that movement of the arms 14*a*, 14*b* from their extended condition and into their collapsed condition occurs essentially in a reverse manner to that described above. Of course, it does not matter which of the arms 14*a* or 14*b* is first repositioned, and furthermore if desired, both arms could essentially be repositioned simultaneously.

During manipulation of the arms 14*a* and 14*b* between the collapsed and extended positions, a portion of the elastic cord 34 will pass freely through the slots 36*a* and 36*b* so that its bias force will urge the proximal ends of the tubular support arms 14*a* and 14*b* into engagement with respective ones of the sockets 30*a*–30*b* and 32*a*–32*b*. In this manner, therefore, the arms 14*a*–14*b* are positively seated within the respective sockets 30*a*–30*b* and 32*a*–32*b* so as to be maintained reliably in the extended or collapsed conditions.

It will be observed that the proximal ends of the tubular arms 14*a* and 14*b* may be rotated generally about the arms' respective elongate axis while seated in the sockets 30*a*–30*b* or 32*a*–32*b*—i.e., the arms 14*a*–14*b* may be rotated about the central axis which defines the respective socket 30*a*–30*b* and 32*a*–32*b* in which the arms are seated. Thus, the bowed configuration of the arms 14*a* and 14*b* may be oriented so as to tension the camouflage curtain 12 in the manner described previously. In this regard, the tubular arms 14*a* and 14*b* are most conveniently cylindrical to allow for free rotation the arms 14*a*, 14*b* relative to the mounting block 18. However, the arms 14*a*, 14*b* may be formed of other geometric cross-sectional tubular configurations (e.g., square, rectangular, triangular, and the like), in which case the bowed orientation of the arms 14*a*, 14*b* may be selected by physically removing, rotating and repositioning the arms 14*a*, 14*b* relative to the sockets 30*a*, 32*a* or 30*b*, 32*b*.

The camouflage device 10 according to the present invention is most conveniently provided to the consumer in kit form including: (1) the upper mounting block 18; (2) the lower mounting block 20; (3) the arms 14*a* and 14*b* joined by an elastic cord 34; (4) the arms 16*a* and 16*b* joined by an elastic cord (not shown in the accompanying drawings but similar to cord 34); and (5) a camouflage curtain 12 adapted to being removably attached to the arms 14*a*–14*b* and 16*a*–16*b* along its upper and lower edge regions (for example, by means of a hemmed sleeve that may be threaded onto the tubular arms 14*a*–14*b* and 16*a*–16*b*). In this connection, several camouflage curtains 12 having different camouflage patterns may be provided so that the user may select the appropriate curtain 12 in dependence upon the outdoor environment and/or season in which it is intended to be used (e.g., woodlands, marshes, and the like). In addition, a bag for carrying and/or storing the kit components may also be provided.

Thus while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A camouflage device for an archery bow comprising:

upper and lower mounting blocks attachable at separated locations to said archery bow relative to a long axis of the archery bow, said upper and lower mounting blocks including respective mounting sockets each of which establishes an axis which is generally transverse to the archery bow's long axis when said upper and lower mounting blocks are attached thereto;

upper and lower elongate support arms received within said mounting sockets of said upper and lower mounting blocks, respectively, so that said upper and lower support arms are likewise in separated relationship relative to a long axis of the archery bow and extend outwardly from the archery bow generally coaxially relative to said transverse axis established by said mounting sockets of said upper and lower mounting blocks, respectively; and a camouflage curtain attached to and extending between said upper and lower support arms; wherein at least one of said upper and lower support arms has a bowed configuration and is rotatable within a respective one of said mounting sockets of said upper and lower mounting blocks about said generally transverse axis established thereby such that said bowed configuration of said one arm assumes first and second states which cause greater and lesser tension to be exerted upon said camouflage curtain between said upper and lower arms.

2. A camouflage device as in claim 1, wherein opposing pairs of arms constitute said upper and lower arms.

3. A camouflage device for an archery bow comprising:

upper and lower mounting blocks attachable to the archery bow in separated relationship relative to a long axis of the archery bow;

upper and lower elongate opposed pairs of support arms attachable to the upper and lower mounting blocks, respectively; and a camouflage curtain attached to and extending between said upper and lower support arms; wherein at least one of said upper and lower support arms has a bowed configuration and is rotatable about an axis generally transverse to the long axis of the archery bow such that said bowed configuration of said one arm assumes first and second states which cause greater and lesser tension to be exerted upon said camouflage curtain between said upper and lower arms, and an elastic cord joining said opposed pairs of support arms.

4. A camouflage device for an archery bow comprising:

upper and lower mounting blocks attachable to the archery bow in separated relationship relative to a long axis of the archery bow;

upper and lower opposed pairs of elongate support arms attachable to the upper and lower mounting blocks, respectively; and a camouflage curtain attached to and extending between said upper and lower support arms; wherein at least one of said upper and lower support arms has a bowed configuration and is rotatable about an axis generally transverse to the long axis of the archery bow such that said bowed configuration of said one arm assumes first and second states which cause greater and lesser tension to be exerted upon said camouflage curtain between said upper and lower arms, wherein said upper and lower mounting blocks include first and second sets of sockets sized and configured to receive a proximal end of a respective one of said support arms, said first and second sets of sockets respectively establishing an extended condition wherein said upper and lower support arms are oriented generally transverse to the long axis of the bow, and a collapsed condition wherein said upper and lower support arms are oriented in general alignment with the long axis of the bow.

5. A camouflage device as in claim 4, wherein elastic cord joins said opposing pair of arms, said elastic cord exerting a bias force on said opposing pair of arms to seat said proximal ends thereof within one of said sockets of said first and second sets of sockets.

6. A kit camouflage device for an archery bow comprising:

upper and lower mounting blocks adapted to being attached at separated positions to an archery bow;

upper and lower pairs of tubular support arms each having a bowed configuration and respectively connectable to the upper and lower mounting blocks so as to be movable between (i) a collapsed condition in which the upper and lower pairs of tubular support arms are generally aligned with the archery bow; and (ii) an extended condition in which the upper and lower pairs of tubular support arms are oriented generally transversely to the archery bow; and a camouflage curtain attachable along its upper and lower edge regions to said upper and lower pairs of tubular support arms; wherein said upper and lower tubular support arms are rotatable relative to said upper and lower pairs of tubular support arms to cause said bowed configuration to assume first and second states corresponding to greater and lesser tensioning of said camouflage curtain between said upper and lower pairs of tubular support arms, wherein said upper and lower mounting blocks include first and second sets of sockets sized and configured to accept therewithin a proximal end of a respective one of said tubular support arms, said first and second sets of sockets respectively establishing said collapsed and extended conditions.

7. A camouflage device as in claim 6, wherein said upper and lower pairs of arms are each joined by an elastic cord.

8. A camouflage device as in claim 7, wherein said upper and lower mounting blocks include slots which join one of said sockets of said first set to one of said sockets of said second set so as to allow a length of said elastic cord to pass therethrough when said upper and lower pairs of arms are moved between said collapsed and said extended conditions.

9. A camouflage device as in claim 8, wherein said upper and lower mounting blocks include a removal slot joining said second set of sockets to allow a length of said elastic cord to pass therethrough when said upper and lower pairs of arms are removed from said respective upper and lower mounting blocks.

10. A camouflage device as in claim 6, wherein said upper and lower mounting blocks include stops associated with said second set of sockets to establish a positional limit therewithin of the proximal end portion of a respective one of said arms.

11. A camouflage device as in claim 1, in kit form.

12. A camouflage device for an archery bow comprising:

a pair of mounting arms joined to one another by means of an elastic cord which exerts a bias force tending to draw said pair of mounting arms closer to one another;

a camouflage curtain attachable to and dependently supportable by said mounting arms;

a mounting block which includes first and second sets of paired sockets sized and configured to receive proximal end portions of said pair of mounting arms and respectively establishing a collapsed condition wherein said pair of mounting arms is generally aligned with said archery bow, and an extended condition wherein said pair of mounting arms extend generally transverse relative to the archery bow; wherein said pair of mounting arms are movable between said extended and collapsed conditions by separating said proximal end portions of said pair of mounting arms from one of said first and second sets of sockets against said bias force of said elastic cord, and then aligning said proximal end of said pair of mounting arms with another of said first and second sets of sockets, whereby said bias force of said elastic cord forcibly seats said proximal end portions of said pair of support arms within said another of said first and second sets of sockets.

13. A camouflage device as in claim 12, further comprising a second mounting block and a second pair of support arms, said second mounting block adapted to being mounted to the archery bow in spaced relation to said first-mentioned mounting block, and said camouflage curtain adapted to being extended between said first-mentioned pair of mounting arms and said second pair of mounting arms.

14. A camouflage device as in claim 13, wherein at least one of said first mentioned and said second pair of mounting arms has a bowed configuration, said at least one of said first mentioned and said second pari of mounting arms being rotatable relative to said first-mentioned mounting block and said second mounting block to cause said bowed configuration to assume a first and second states respectively corresponding to greater and lesser tensioning of said camouflage curtain between said first-mentioned pair of mounting arms and said second pair of mounting arms, respectively.

15. A camouflage device as in claim 14, wherein said mounting block includes slots joining respective sockets of said first and second pairs of sockets to define a passageway through which a length of said elastic cord passes when said pair of mounting arms is moved between said extended and collapsed conditions.

16. A camouflage device as in claim 15, wherein said mounting block further includes a second slot coextensive with a lengthwise dimension of said mounting block to define a passageway through which a length of said elastic cord passes to enable said pair of mounting arms to be disassembled from said mounting block.

17. A camouflage device as in claim 12, wherein said camouflage curtain includes a plurality of cuts forming a corresponding plurality of flaps simulating natural foliage.

18. A camouflage device as in claim 12, wherein said mounting block includes an adhesive layer on a rear surface thereof to facilitate fixedly attaching said mounting block to the archery bow.

19. A camouflage device as in claim 12, wherein each of said pair of support arms are tubular.

20. A camouflage device as in claim 19, wherein said pair of support arms are cylindrical.

21. A camouflage device as in claim 20, wherein said second set of sockets includes stops to establish a positional limit therewithin of the proximal end portion of a respective one of said arms.

22. A camouflage device as in claim 12 in kit form.

* * * * *